(12) United States Patent
Neyedly

(10) Patent No.: US 12,454,356 B2
(45) Date of Patent: Oct. 28, 2025

(54) PAYLOAD MOUNTING APPARATUS WITH LOW-PROFILE FLOOR BRACE SYSTEM

(71) Applicant: 1281329 Alberta Ltd., Calgary (CA)

(72) Inventor: Ross James Neyedly, Calgary (CA)

(73) Assignee: 1281329 Alberta Ltd., Calgary (CA)

( * ) Notice: Subject to any disclaimer, the term of this patent is extended or adjusted under 35 U.S.C. 154(b) by 0 days.

(21) Appl. No.: 19/032,805

(22) Filed: Jan. 21, 2025

(65) Prior Publication Data

US 2025/0171148 A1    May 29, 2025

Related U.S. Application Data

(62) Division of application No. 17/971,387, filed on Oct. 21, 2022.

(51) Int. Cl.
*B64D 7/00* (2006.01)

(52) U.S. Cl.
CPC ..................... *B64D 7/00* (2013.01)

(58) Field of Classification Search
CPC ... B64D 7/00; B64D 7/08; B64D 1/02; B64D 1/04; B64D 1/06; B64C 1/1407; B64C 1/1415; B64C 7/00
See application file for complete search history.

(56) References Cited

U.S. PATENT DOCUMENTS

| | | | |
|---|---|---|---|
| 5,927,648 A * | 7/1999 | Woodland | B64D 7/00 244/129.1 |
| 7,387,276 B1 * | 6/2008 | Smith | B64C 1/1415 244/129.1 |
| 10,106,239 B2 * | 10/2018 | Woodland | B64C 1/36 |
| 10,577,073 B2 * | 3/2020 | Woodland | B64C 1/36 |
| 10,969,256 B2 * | 4/2021 | Parsons | B64C 1/1415 |
| 11,242,128 B2 * | 2/2022 | Woodland | B64D 47/08 |

* cited by examiner

Primary Examiner — Arfan Y. Sinaki
(74) Attorney, Agent, or Firm — Baker Botts L.L.P.

(57) ABSTRACT

In one embodiment, a method includes removing a cargo handling rail from a cargo floor of an aircraft and installing a brace system directly into the cargo floor. The brace system includes a support plate and a spreader bar. The support plate is parallel to the cargo floor and has a surface that interfaces with the cargo floor and multiple slots for rollers. The spreader bar is parallel to the cargo floor and perpendicular to a cargo handling rail face and parallel to the support plate.

6 Claims, 17 Drawing Sheets

PAYLOAD MOUNTING APPARATUS WITH LOW-PROFILE FLOOR BRACE SYSTEM

PRIORITY

This application is a divisional under 35 U.S.C. § 121 of U.S. patent application Ser. No. 17/971,387, filed 21 Oct. 2022, which is incorporated herein by reference.

TECHNICAL FIELD

This invention relates to an aircraft-based mounting system, and in particular is related to temporary, mounted, portable, and modular mounting systems that do not require airframe modifications to accommodate the external carriage of airborne hardware suites.

BACKGROUND

Aircraft-based platforms are ideally suited for time-sensitive emergency, as well as routine, sensing or other electronic based search, monitoring, surveillance and response activities. For example, numerous civilian- and military-based aircraft response agencies require high resolution aerial thermal (IR), radar, ultraviolet (UV), photographic, multi-spectral, hyperspectral or other sensor imagery in a timely manner. Similarly, such agencies may also require electronics intelligence (ELINT) data, communications relay, communications intelligence (COMINT) data, signals intelligence (SIGINT) data, communications jamming, satellite communications (SATCOM), satellite telemetry, electronic support measures (ESM), electronics countermeasures (ECM), anti-submarine warfare (ASW), magnetic anomaly detection (MAD), missile counter measures (MCM) pods, or other types of electronic or image sensing information pods in a timely fashion to formulate a given response.

Existing aircraft mounting methodologies for these or related $C^4ISR$ electronics and sensors are typically packaged in systems dedicated to a specific aircraft, or partially dedicated in as much that a given system can be mounted within a pod that can be moved between aircraft but still necessitates air frame modifications to accommodate wing or belly mounting pylons typical of the USAF RC-12.

As an alternative, an aircraft door compatible temporary mounting system is described in U.S. Pat. No. 5,927,648, entitled "Aircraft Based Sensing, Detection, Targeting, Communications, and Response Apparatus" issued 27 Jul. 1999 to Richard L. K. Woodland, and incorporated herein by reference. The Woodland system is able to accommodate mounting on various aircraft without incurring any airframe modifications but is completely reliant on a mounting pallet to absorb flight induced loads, which are then transferred from the torque pallet into the aircraft floor structure. The pallet mounted special mission assembly disclosed by Woodland when used in conjunction with rear loading/jettisoning cargo aircraft like a Lockheed Martin C-130 also compromises all other backend air drop operations, which require use of the air deployment system (ADS) rails.

Accordingly there is an on-going, unaddressed need to achieve a flexible, rapidly-installed, roll-on, cost-effective, airborne $C^4ISR$ and special mission deployable payload support stanchion and pod mounting methodology.

Further, there is a need for such a deployable payload support stanchion and pod that permits a 360-degree field of view (FOV).

Further, there is a need for such a deployable payload support stanchion and pod that does not interfere with backend cargo air drop operations.

Further, there is a need for such a deployable payload support stanchion and pod that provides in-flight extension and retraction of the deployable payload support stanchion and payload assemblies into the fuselage for reloading or changing sensor configurations, and provides an alternate load transfer path for externally-mounted payload systems into the primary aircraft structure without using a pallet or necessitating modifications to the host aircraft.

Still further, there is a need for such a deployable payload support stanchion and pod that is secured to the host aircraft without the necessity of altering the position of the mechanism used to hold it in place.

SUMMARY OF PARTICULAR EMBODIMENTS

The apparatus and system of the present disclosure solves the problem of temporarily mounting aircraft based special mission payload systems without compromising air drop operations by utilizing a low-profile floor brace system (LPFBS). Other restraint means are also employed by way of bolts, which connect the LPFBS to the host aircraft floor. Typically the LPFBS is machine milled to a specific contoured shape that reflects the bolt patterns, compatible metallurgy, and operability mechanisms of the specific rail section it is to be mounted to. For example, LPFBSs adjacent the paratroop doors of a Lockheed Martin C-130 aircraft may be different from those of an Alenia C-27J, yet the mounting methodology and load transfer path are identical as employed in the current disclosure. The LPFBSs for each aircraft may appear different but the connection, fastening, and load transfer methodologies are identical. The LPFBS is also typically milled from a single block of non-ferrous aerospace metal that accommodates restraint and bolt devices and unique positioning of the same along the top and sides of the components to which the LPFBS is connected. The LPFBS is effectively engineered to the adequate thickness to provide for the transfer of in-flight dynamic torque, lateral and other loads exerted upon the various mission payload pods and then transferred through the deployable payload support stanchion to the low-profile floor brace system (LPFBS) and associated cargo tie down D-ring locations thereby precluding the requirement for a loads transfer (torque) pallet, or dedicated airframe modifications that interfere with aircraft backend operations.

The LPFBS that is part of the present apparatus and method is capable of replacing previous assemblies requiring multiple components attached to a brace system. Furthermore, the LPFBS is designed with a low profile such that it has the advantage of providing support for a payload apparatus without hindering movement within the aircraft without also requiring that the brace itself be shifted or moved.

The LPFBS includes a support plate that interfaces to the floor of the aircraft, a spreader bar connected to the floor of the aircraft and a cargo handling rail face, and one or more apertures configured to accommodate one or more rollers that may be used on the aircraft.

Particular embodiments utilize an electrically-actuated deployable payload support stanchion, which is attached to the LPFBS and installed through a fuselage side door orifice. The system apparatus as described herein is equipped with a NATO standard ordinance rack to accommodate the pod mounting and release of a variety of mission pods or stores that may be suspended external of the host airframe. Said actuated deployable payload support stanchion also incorporates a redundant manual retraction and extension drive assembly, which is independent of the electrical drive system. Once in flight the deployable payload support stanchion can be articulated to a position below the lower periphery of the host aircraft fuselage to achieve a 360-degree FOV for unobstructed electro-optical, radar, RF or other sensor coverage, or can be used to jettison stores. The actuated deployable payload support stanchion can also be extended from the aircraft interior or retracted inboard back into the cargo bay while in flight for the purpose of maintaining mission security, reloading stores, changing sensors or other mission packages affixed to the end of the deployable payload support stanchion.

A second variant of the preferred embodiment of the present invention incorporates a non-actuated deployable payload support stanchion attached to the LPFBS that is of variable length and angle in the X, Y, or Z axis, and also transits under a door plug mounted within an open doorway to position a payload external of the aircraft in a predetermined position that remains static throughout the flight and does not require a 360-degree FOV.

For heavier payloads that may require a diverse load transfer path into the cargo floor of the host aircraft, the preferred apparatus of the payload mounting apparatus is equipped with a plurality of low-profile floor brace systems (LPFBS), which distributes the loads over a floor loads plate (FLP) that is mechanically attached to at least a plurality of cargo floor tie down rings using adjustable cargo cam lock means.

Once the deployable payload support stanchion and LPFBS are installed, the preferred embodiment incorporates a temporary, one- or two-piece segmented pressurized door plug or upper door with a close-out panel assembly below with a non-dedicated door retraction system that is fully operable in flight. In either of the one- or two-piece versions, the door plugs or close-out panel assemblies are removable and replaceable through the lower periphery to accommodate the protrusion of the deployable payload support stanchion into the door panel in such a way as to provide a pressurized seal about the deployable payload support stanchion when the door plug or close-out panel assembly is closed. The deployable payload support stanchion may replace the close-out panel, while the upper door is used with the deployable payload support stanchion installed.

The integrated system of the embodiment of the present invention also incorporates connectivity to and utilization of on-board workstations, aircraft positional data, communications systems, data processing systems, stores or other mission equipment linked to mounting and employment of the fixed position or articulated deployable payload support stanchion described herein. Further, the complete system of the present invention utilizes various iron lung, litter, missile, winch, auxiliary, or other existing electrical power interfaces to drive the various components and mission systems of the present invention on the host aircraft without the need for modifications.

Installation of the completed special mission system deployable payload support stanchion, low-profile floor brace systems (LPFBS), door plug or close-out panel assembly, and associated assemblies of the present invention are installed in the unique manner described herein to enable use of the LPFBS and associated assemblies, operability of the host door plug or closeout panel assembly, and extension and retraction of the deployable payload support stanchion while in flight without interfering with the host aircraft's normal performance envelope, emergency egress, air drop, or other back end operations of the host aircraft.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method and a system, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Apparatus

Figure 1A:
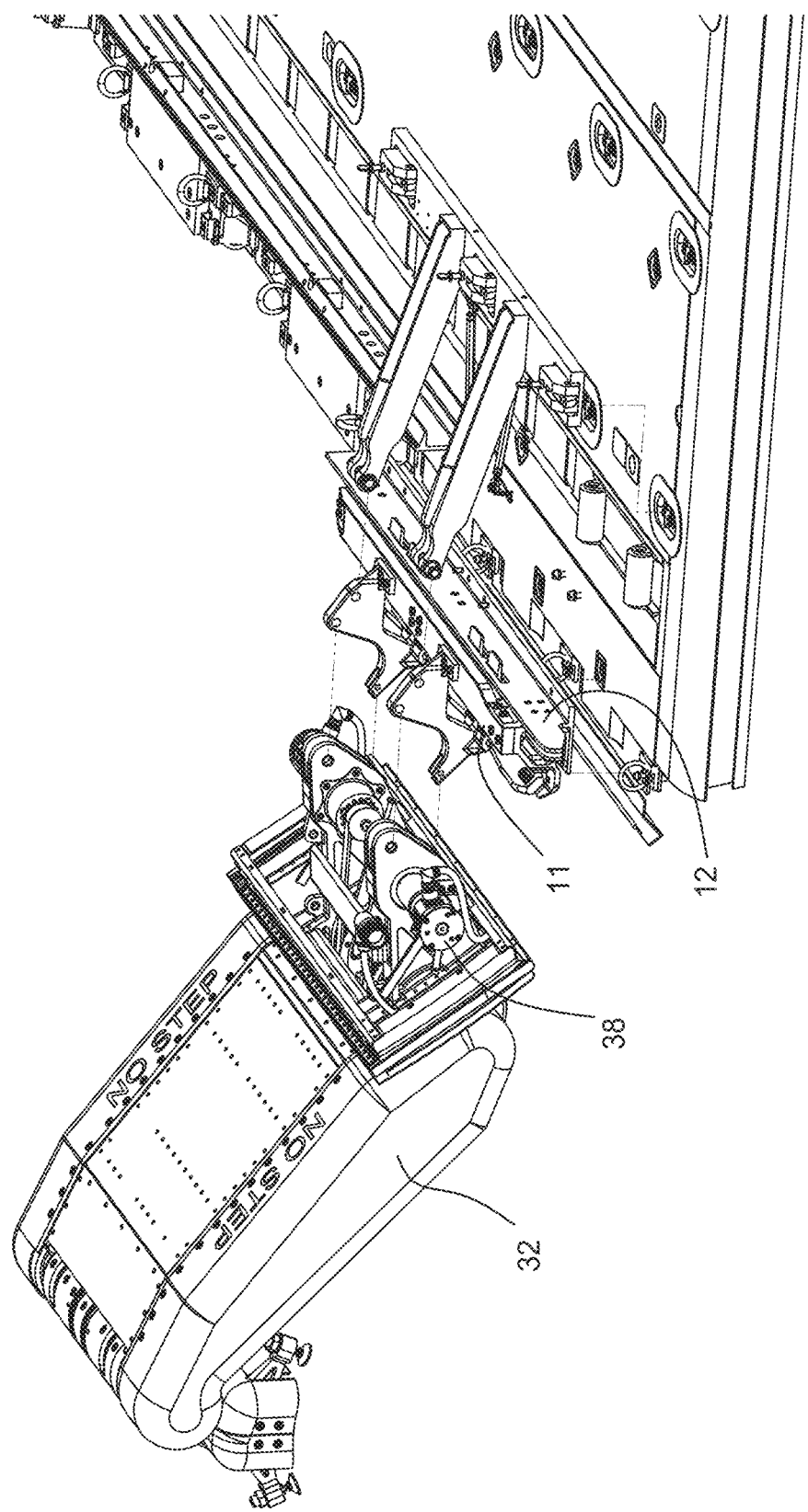
FIG. 1A is an exploded view of the ADS Rail section and AMS with bolt patterns, 6 D-rings, and overall attachment methodologies of all plate angles, holes, and fastening components.
Figure 1B:
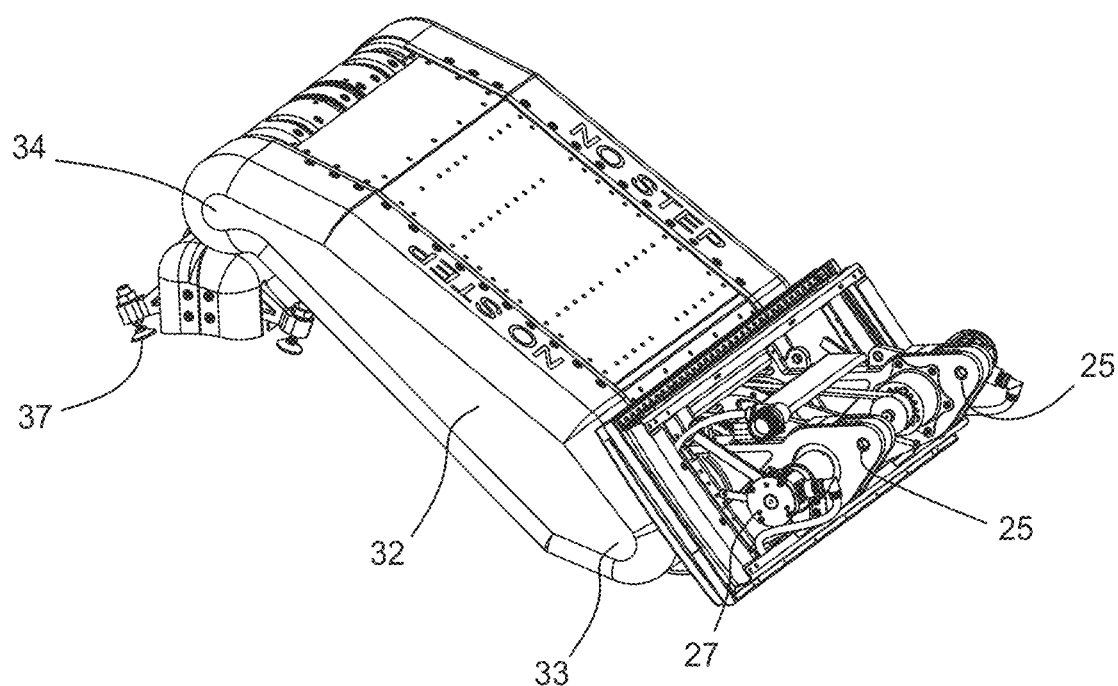
FIG. 1B is an exploded overview of the primary structural and mechanical attachment mechanism of a deployable payload support stanchion including the motor housing bolt assembly, deployable payload support stanchion motor housing casing, shoulder armature assembly, deployable payload support stanchion, secondary wrist armature assembly, and adjustable sway braces.
Figure 1C:
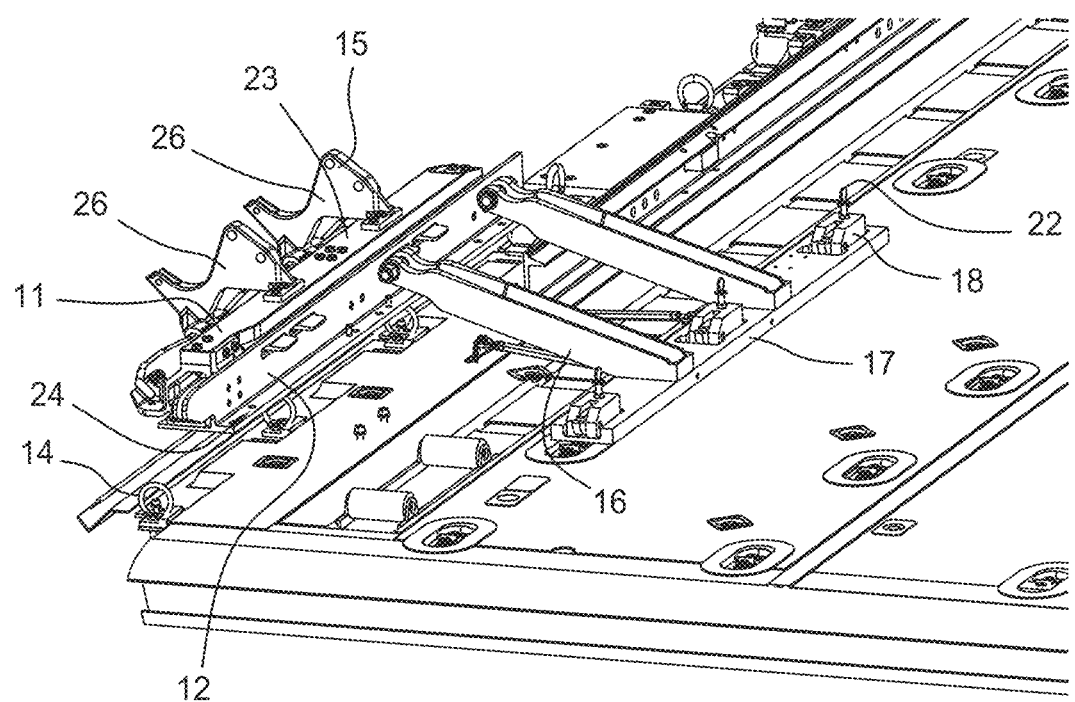
FIG. 1C is an exploded overview of the primary structural and mechanical attachment mechanism of a deployable payload support stanchion including the adaptive mounting system, adjustable D-ring locks, cargo tie down D-rings, ADS rail, load transfer braces, floor load plate, adjustment bolts, load transfer brace flange, AMS restraining bolts, ADS restraining bolts, and AMS motor housing flanges.

FIG. 1A, FIG. 1B, and FIG. 1C depict an exploded overview of a particular embodiment of the primary structural and mechanical attachment mechanisms of a deployable payload support stanchion assembled as it would normally be connected together and installed to achieve fitment of a pod or other apparatus aboard a Lockheed-Martin C-130 aircraft 1, including one or more adaptive mounting systems (AMS) 11. As an example and not by way of limitation, adaptive mounting systems 11 can be perforated with bolt holes which interface and otherwise permit connectivity to a standard ADS rail 12, by means of multiple AMS restraint bolts 23 (as shown in FIG. 1C). Once the adaptive mounting systems 11 have been secured to the ADS rail 12, or a section of the ADS rail 12, the rail or section can be positioned and secured to the aircraft floor utilizing multiple ADS restraint bolts 24 and/or cargo tie down D-rings 14, with adjustable D-ring locks 18 which can be tensioned by turning the adjustment bolt 22, until the ADS rail 12, section is secure against the aircraft floor. For aircraft not having an ADS rail 12 already installed, those skilled in the art of aircraft component fabrication can install an ADS rail 12 or section that can be made to match the host aircraft cargo floor bolt pattern. In this manner, the present invention can be made to accommodate a variety of airframe types.

Figure 2:
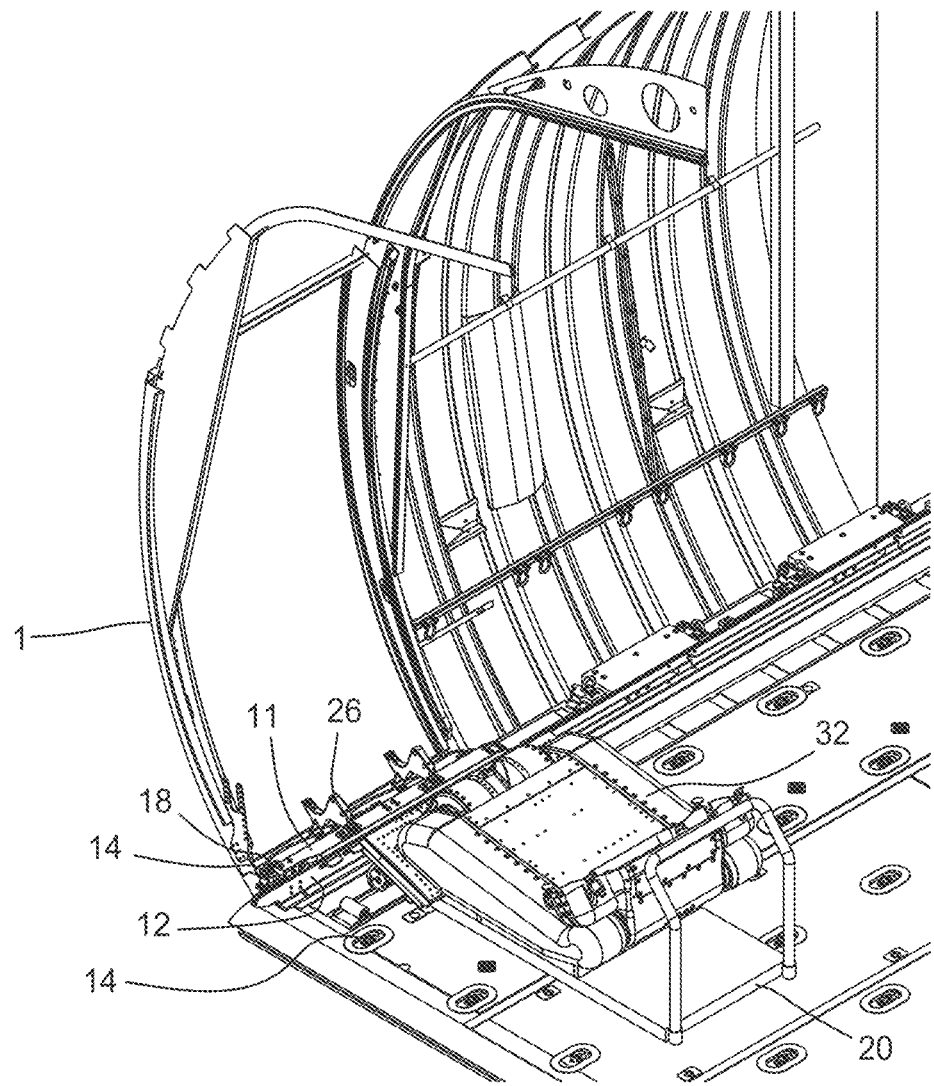
FIG. 2 depicts a rotationally-articulated deployable payload support stanchion being aligned to the AMS using the lower section of the transport case after the AMS has been attached to the ADS rail.

As depicted in FIG. 2, in particular embodiments, a payload mounting apparatus can be housed within a modular case or cases so as to facilitate transport and aid in mechanical interface alignment. As an example and not by way of limitation, as shown, the payload mounting apparatus can be stored and transported in a deployable payload support stanchion transport and alignment carrier (TAC) 20, a portion of which can be temporarily secured to the aircraft floor when the deployable payload support stanchion is to be installed. The TAC holds the deployable payload stanchion in a cargo container of the aircraft during transportation. When the deployable payload support stanchion is loaded onto the aircraft, the TAC may be used to roll the deployable payload stanchion onto the aircraft and align the deployable payload stanchion with motor transmission housing brackets (MTB). Once aligned, the deployable payload support stanchion may be pinned to the MTB and rotated up/off the TAC and through an aperture or door. A motor housing bolt assembly 25 (as shown in FIG. 1B) can be inserted through and secured to an AMS motor housing flange 26, to connect the deployable payload support stanchion 32, about a shoulder armature assembly 33 (as shown in FIG. 1B), with the adaptive mounting system (AMS) 11. Once the deployable payload support stanchion 32 is secured to the adaptive mounting plate (AMP) 11, the shoulder armature assembly 33 can be rotated outboard and the deployable payload support stanchion TAC 20, disconnected and removed from the host aircraft. The deployable payload support stanchion may be rotationally connected to the aircraft. Further, the deployable payload support stanchion may include an upper transmission assembly that connects to a lower transmission assembly via a timing shaft that maintains the payload assembly in a vertical position during support stanchion deployment and retraction. As an example and not by way of limitation, the deployable payload support stanchion extends from an interior of the aircraft to an exterior of the aircraft via a pressurized door plug that interfaces to the aircraft. As an example and not by way of limitation, the deployable payload support stanchion may be designed to rotate into the aircraft during flight via a linear or rotary actuator unto a secondary retract. The secondary retract may further be coupled to a mounting system plate that is designed and fabricated specifically to accommodate one or more restraint fasteners or devices specific to a cargo handling system. In particular embodiments, a closeout panel assembly may be installed in an aperture that would normally hold a pressurized door. Although this disclosure describes a payload mounting apparatus and deployable payload support stanchion assembled in a particular manner, this disclosure contemplates a payload mounting apparatus and deployable payload support stanchion assembled in any suitable manner.

Figure 4:
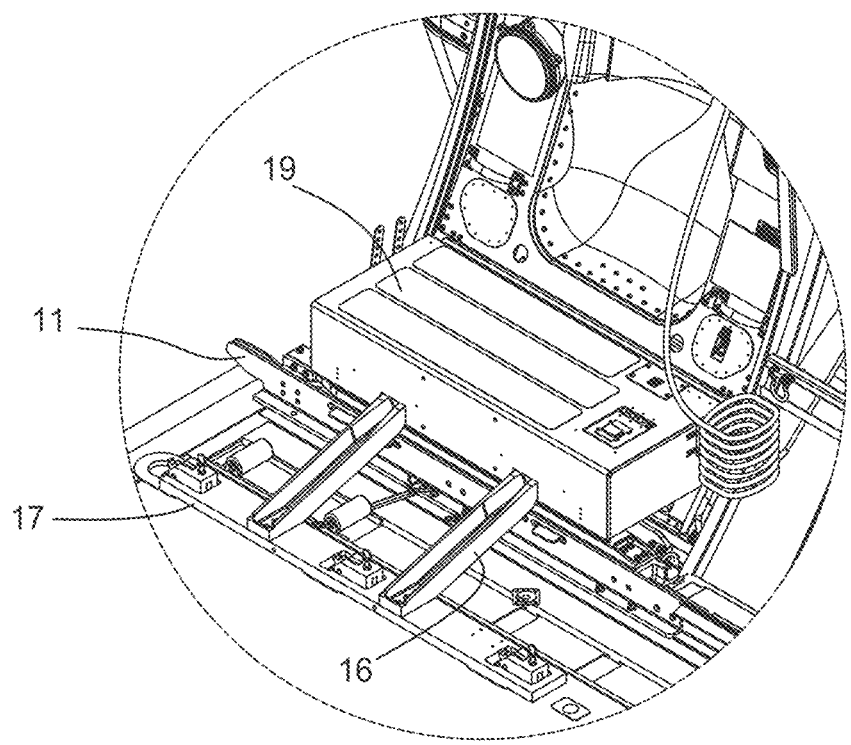
FIG. 4 depicts a completed assembly installed and covered by a removable armored AMS cover.
Figure 5:
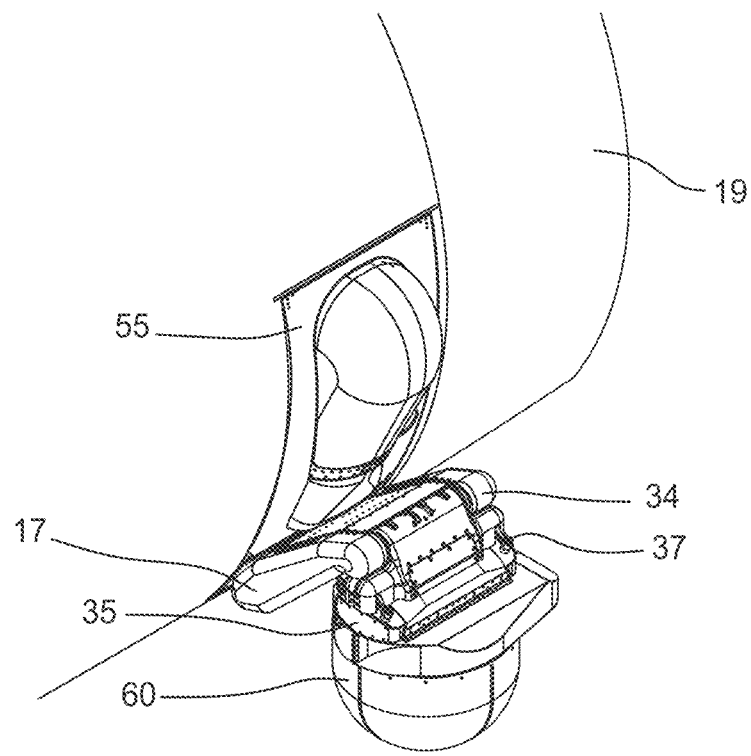
FIG. 5 is an exterior depiction of a deployable payload support stanchion in the retracted position with a single sensor attached to BRU-12 bomb rack with conformal fairing and sway braces deployed, and an observer bubble window installed within the door plug.

In particular embodiments, the shoulder armature assembly 33 may accommodate the mounting and functional integration of one or more electrical drive motors 38. As an example and not by way of limitation, two redundant electrical drive motors 38 are each equipped with a brake disengagement handle 39 for use in the event that both drive motors 38 fail. In such a failure the brake disengagement handle 39 can be activated, which allows the motors to turn freely thereby permitting a hand actuated speed wrench to be inserted into the manual retraction socket 40, to retract or extend the rotationally-actuated deployable payload support stanchion 32. As shown in FIG. 4, as an example and not by way of limitation the entire motor housing and shoulder armature assembly 33, assembly can accommodate an AMS armored cover 19, to protect the manned operator typically located above at a bubble viewing port.

As noted in FIGS. 5, 6, 7, and 9, in particular embodiments, a payload mounting apparatus may also incorporate a secondary wrist armature assembly 34, which is mechanically connected to the shoulder armature assembly 33, by means of a geared rotating linkage that keeps the wrist armature assembly 34 in the vertical position as the rotationally-actuated deployable payload support stanchion 32, is articulated from a retracted position to a fully extended position exterior of the aircraft. This particular feature does not apply when fully retracting the payload mounting apparatus into the fuselage of the host aircraft. As an example and not by way of limitation, the payload support stanchion may be articulated or fixed to a low-profile floor brace system (LPFBS). As an example and not by way of limitation, the payload support stanchion may be coupled to a spreader bar 28 and/or a support plate 21 that is part of a LPFBS (not shown in FIG. 5, 6, 7, or 9). Additionally, as an example and not by way of limitation, the LPFBS may include adaptive fittings designed to interface with the support plate and the deployable payload support stanchion. As an example and not by way of limitation, the payload mounting apparatus may utilize a transport and alignment carrier (TAC) 20, as illustrated in FIG. 2. As an example and not by way of limitation, the rotationally-actuated deployable payload support stanchion 32, can be equipped with a standard NATO ordinance rack 35, with a fourteen inch set of locking lugs, which can also be fitted with a pylon slipper to accommodate other ordinance racks including a triple ejector rack 36. Regardless of the ejector rack employed, the payload can be stabilized by lateral, gust, and other wind loads by a pair of adjustable sway braces 37, which can be fitted for a variety of pods and payloads suspended at the end of the rotationally-actuated deployable payload support stanchion 32. As an example and not by way of limitation, the operator control mechanism for the stanchion assembly can be located in a handheld device adjacent the door plug or built into the door plug using indicator lights, cabling and switches common to those skilled in aircraft engineering. Although this disclosure describes assembling a payload mounting apparatus in a particular manner, the disclosure contemplates assembling a payload mounting apparats in any suitable manner.

Figure 7:
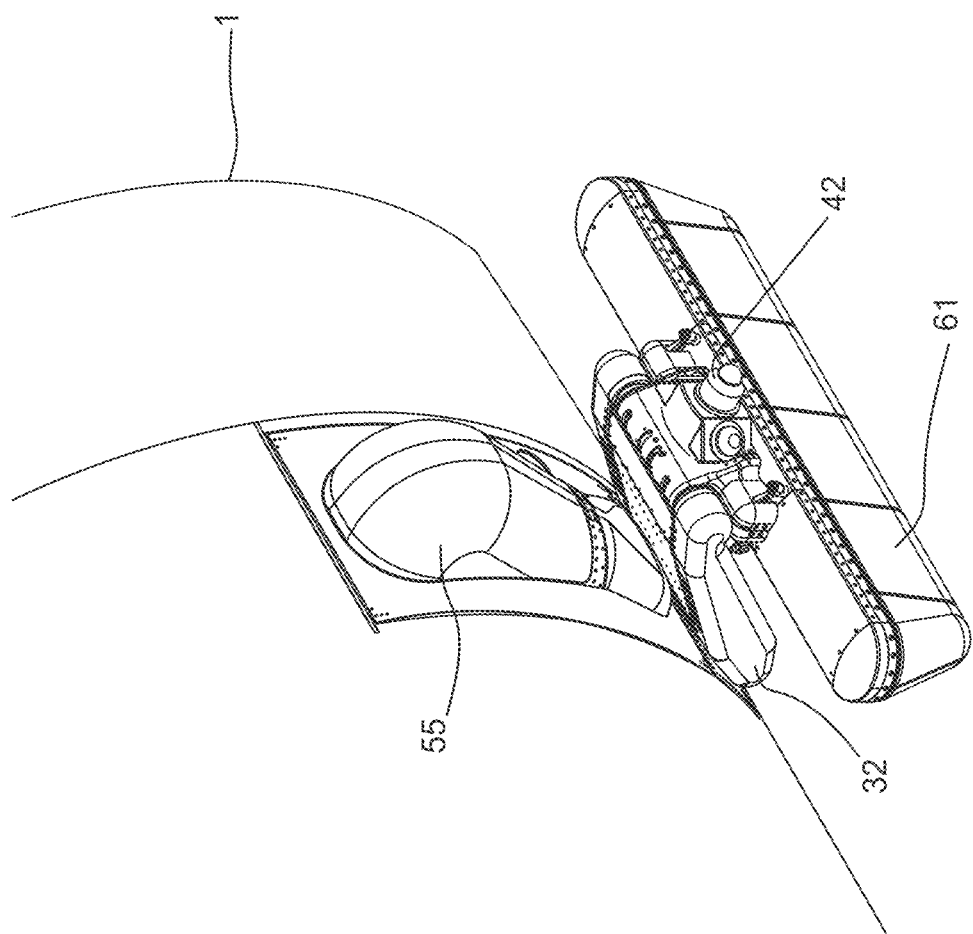
FIG. 7 depicts an exterior view of an articulated deployable payload support stanchion in the retracted position with an RF communications pod and EWSP missile counter measures fairing mounted outboard of the deployable payload support stanchion's secondary wrist assembly with a bubble door and sway braces deployed.

As depicted in FIG. 7, in particular embodiments, the rotationally-actuated deployable payload support stanchion 32, can also accommodate an Electronic Warfare Self Protection, EWSP fairing assembly 42, attached as a knuckle adjacent the wrist armature assembly 34.

Figure 8:
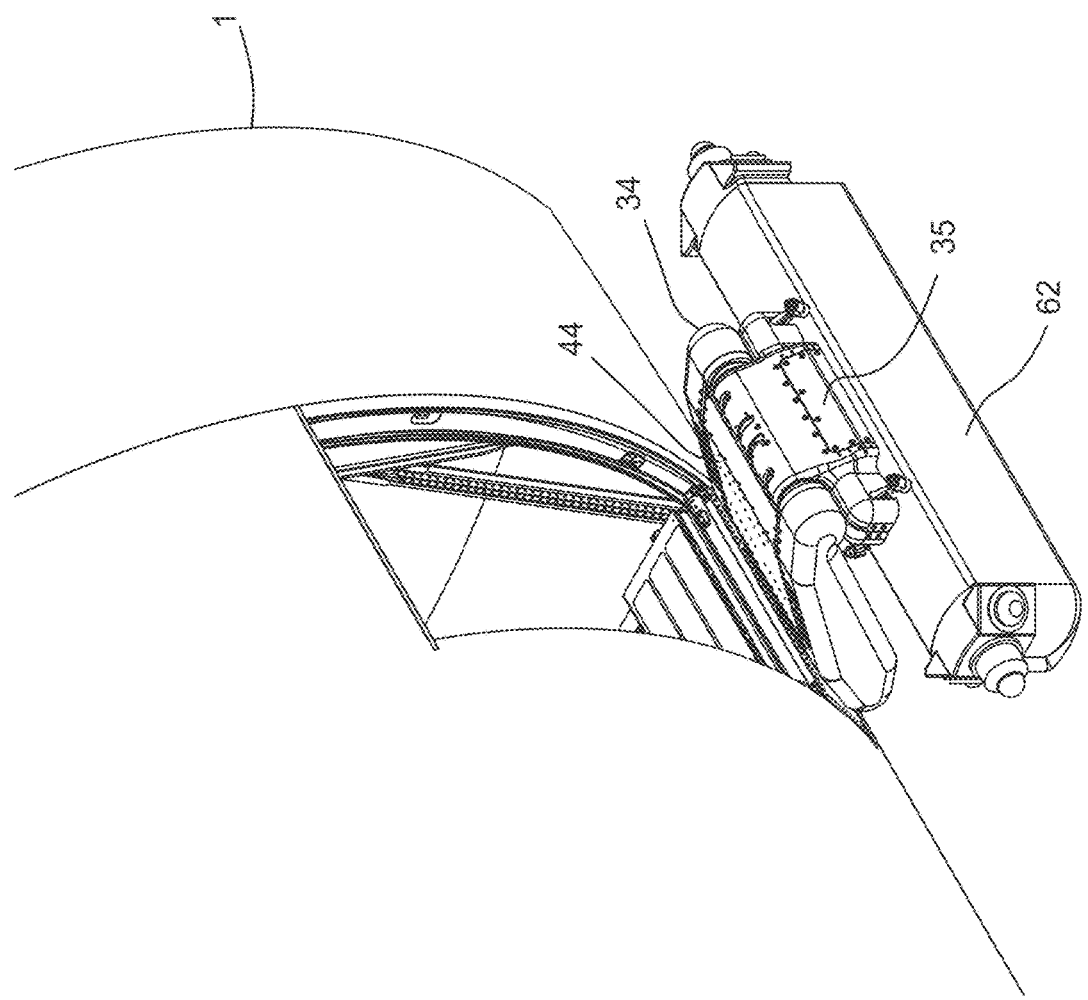
FIG. 8 depicts a non-articulated, fixed position deployable payload support stanchion with EWSP missile countermeasures pod equipped with IR detection set, laser countermeasures, and an ALE-55 towed decoy.
Figure 9:
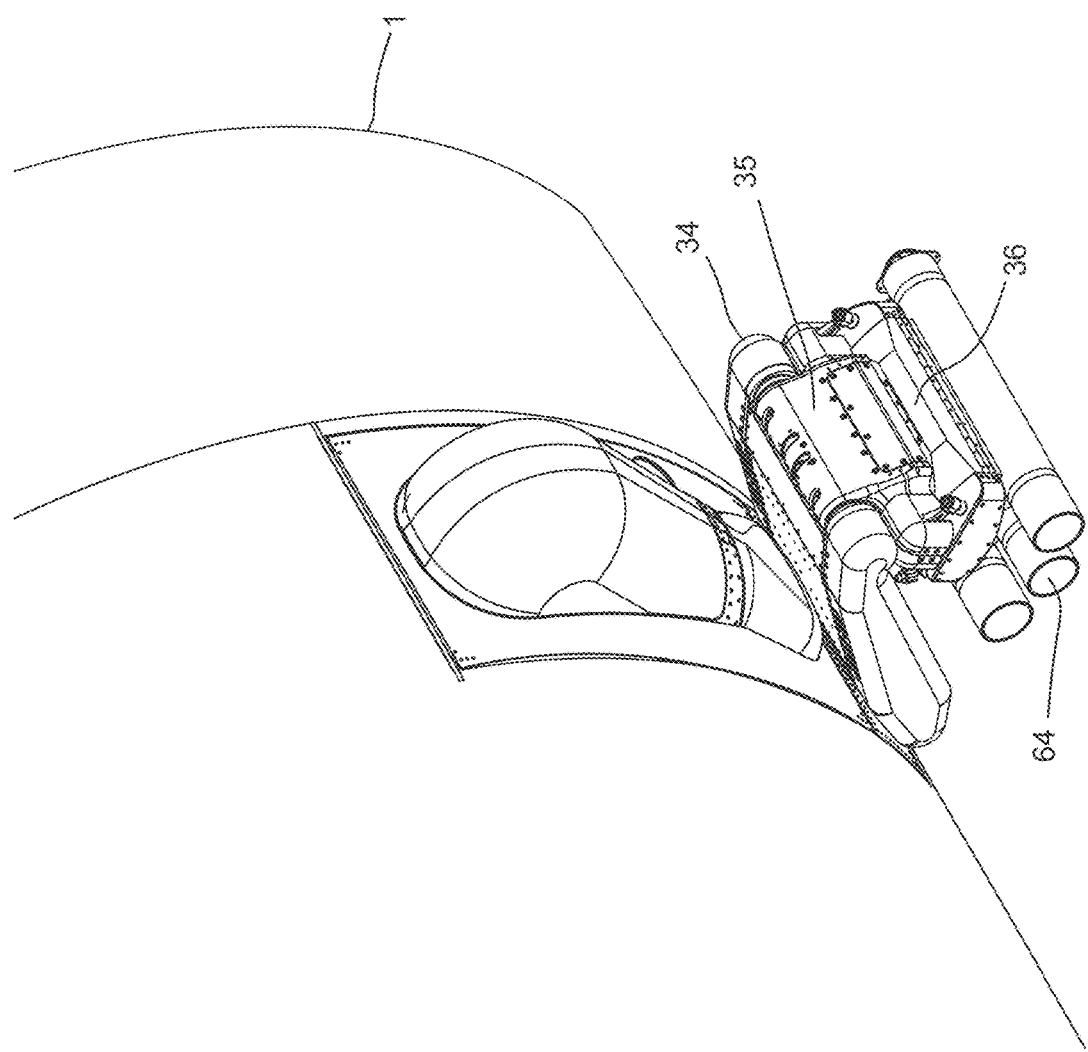
FIG. 9 depicts an articulated deployable payload support stanchion with a triple ejector rack fitment on the deployable payload support stanchion's BRU-12 rack carrying three releasable, in-flight re-loadable, doorway form compliant stores.

As depicted in FIG. 8, in particular embodiments, a non-articulated deployable payload support stanchion 44, can also be mounted to the adaptive mounting system (AMS) 11. Such a configuration can be utilized when rotation or other motion activation is not required, as in the case of hosting dual EWSP missile countermeasures pod 62.

Figure 3:
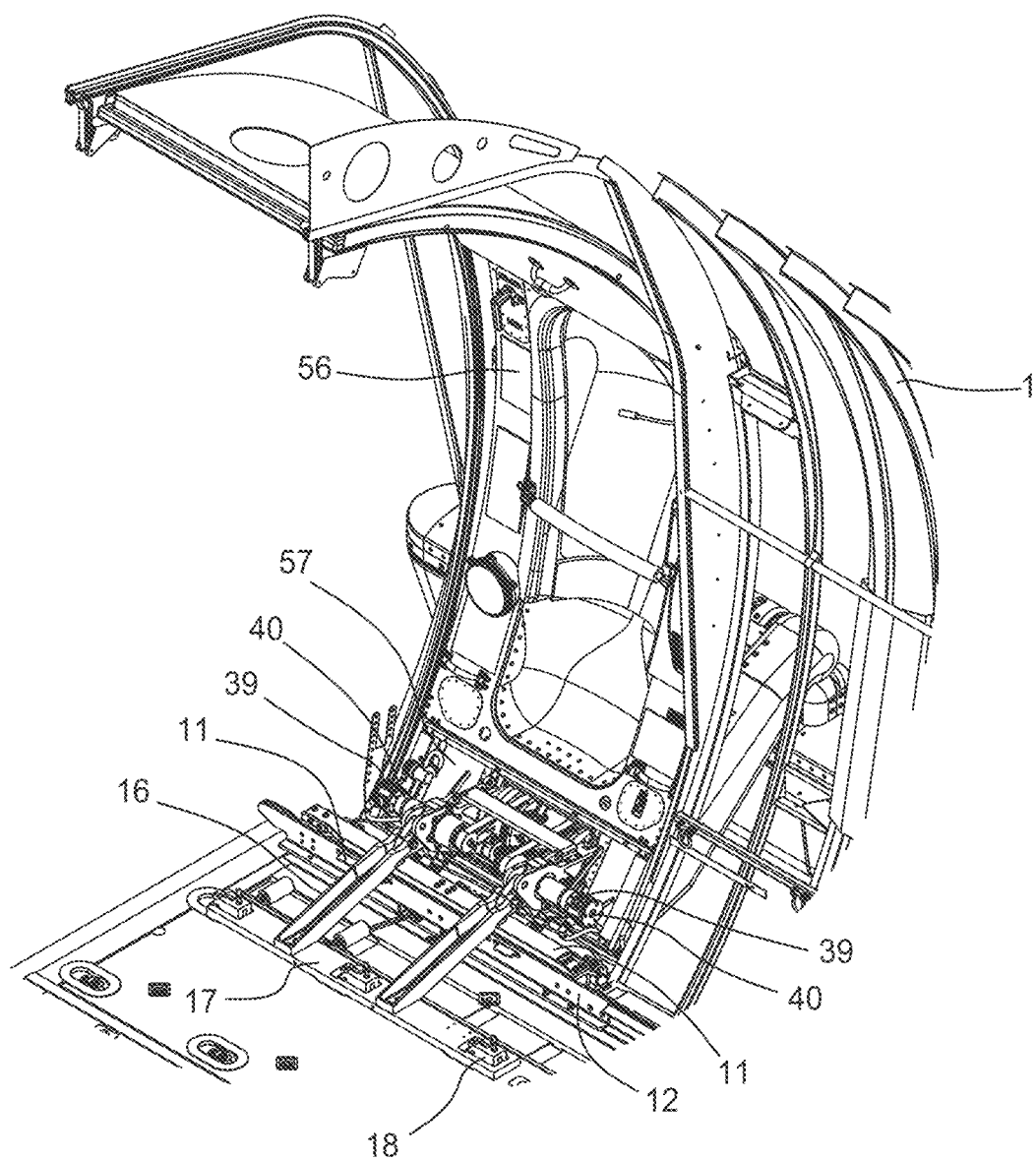
FIG. 3 depicts a deployable payload support stanchion deployed with ADS rail section and AMS attached to same with both the lower close-out panel and upper door plug panel installed with manual retract sockets, disengaging clutch handles, dual electric drives, and control box.
Figure 6:
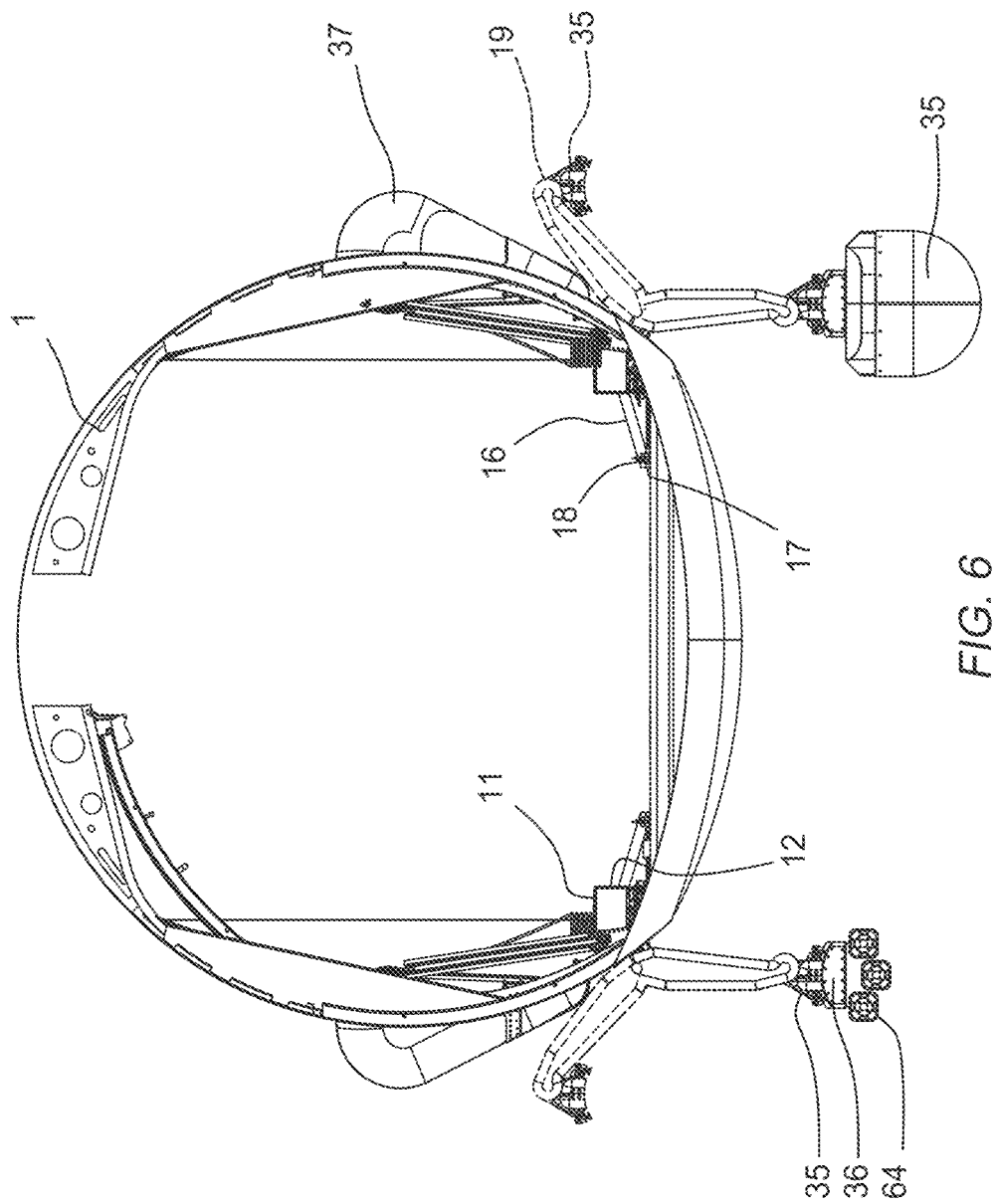
FIG. 6 depicts an external perspective of an apparatus with two deployable payload support stanchions deployed simultaneously outboard of the aircraft fully extended wherein load transfer braces are used, and further wherein one deployable payload support stanchion is equipped with a triple ejector rack loaded with three dispensable stores, and the other deployable payload support stanchion is equipped with an integrated EO/IR surveillance and targeting sensor turret. In both instances the complete range of motion arcs of the deployable payload support stanchions into the aircraft is also depicted illustrating the ability of the deployable payload support stanchion gearing and drive mechanisms to accommodate in flight retraction and extension for sensor change and stores re-loading.
Figure 10:
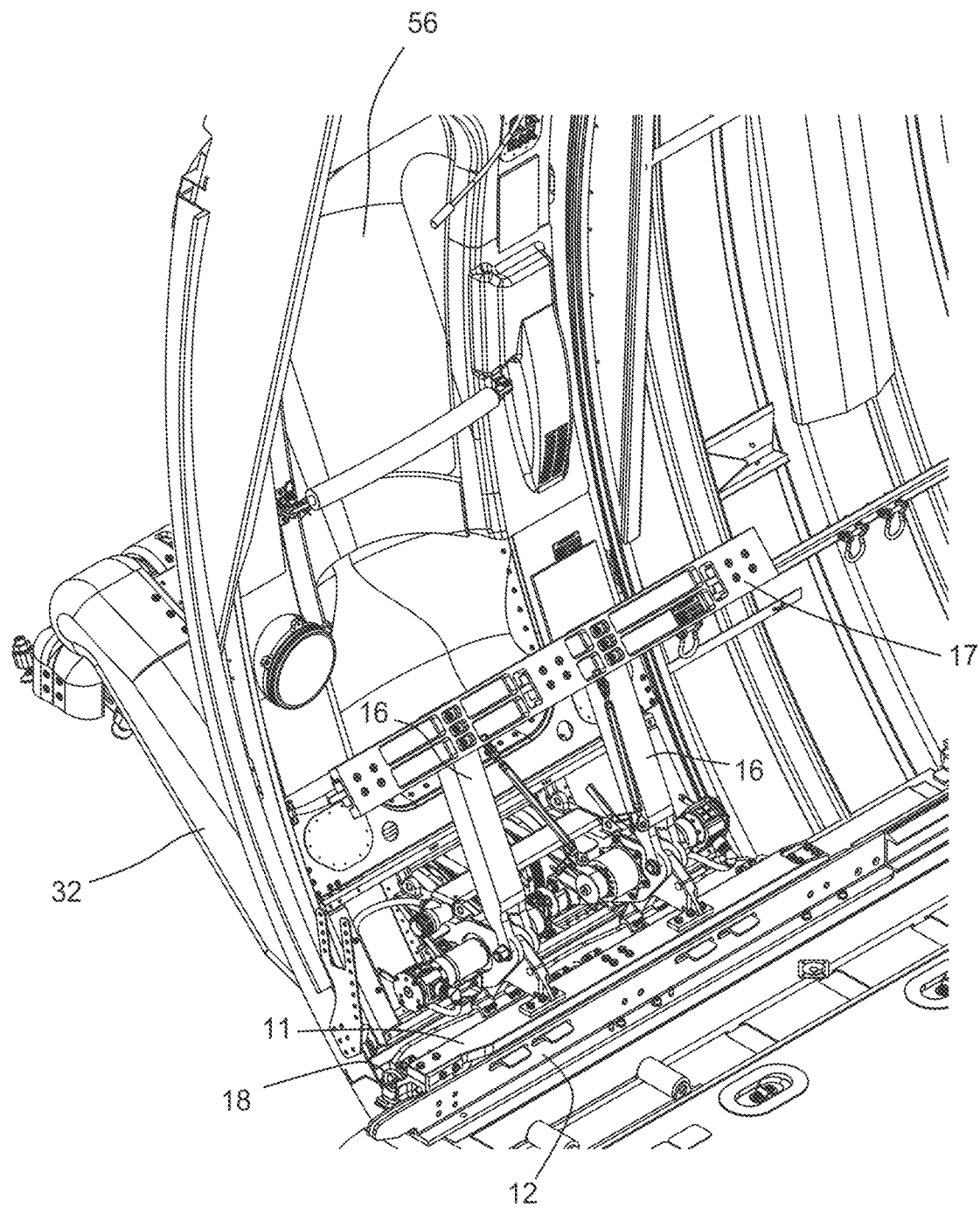
FIG. 10 depicts the installation of a completed mission assembly with the deployable payload support stanchion retracted, and the load transfer braces in the up and retracted position so as to enable use of the ADS rails for air drop.
Figure 11:
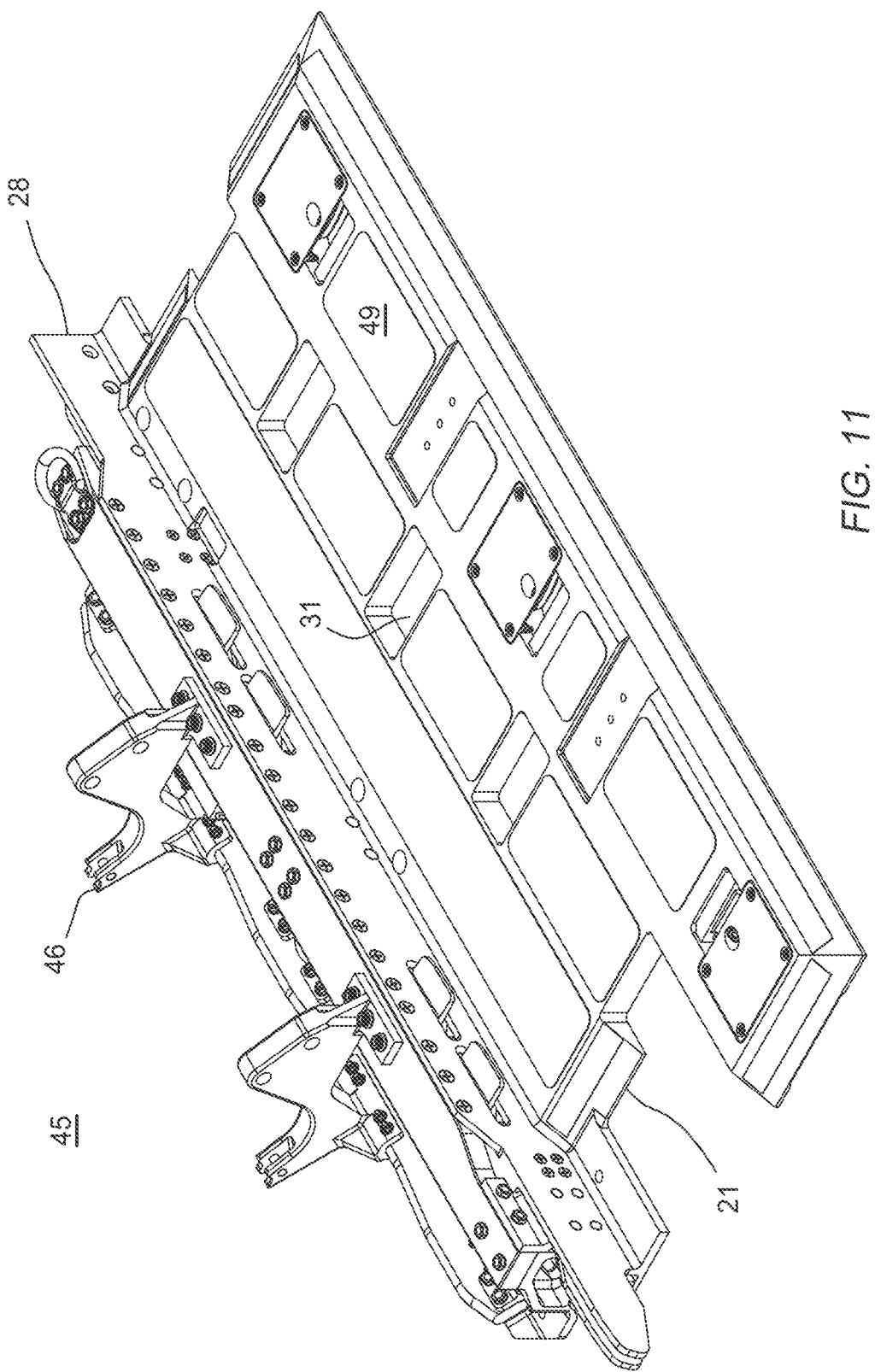
FIG. 11 depicts a close-up view of an embodiment of a low-profile floor brace of the present invention.

As depicted in FIGS. 3, 4, and 6, in particular embodiments, a payload mounting apparatus can also accommodate a rapidly removable pair of load transfer braces (LTB) 16, which can be hinged to the deployable payload support stanchion motor housing casing 27. Such a configuration effectively increases the externally suspended payload weight of the sensor pods or other externally hung stores. As shown in FIG. 10, if during the process of accommodating the increased payload the host aircraft must engage in air drop activities, the transfer load transfer braces (LTB) 16 hinged to a load transfer brace flange 15 can be retracted to their vertical positions, the pallets jettisoned, and the load transfer brace (LTB) 16 and floor load plate (FLP) 17 can be re-secured to the host aircraft cargo floor cargo tie down D-rings 14 using adjustable D-ring locks 18. In particular embodiments, such as shown in FIGS. 3, 4, 6, and 10, the FLP or FLPs may be inboard FLPs, because they are located at the inboard portion of the LTB or LTBs. It is noted although not depicted that a greater number and length of load transfer braces (LTB) 16 and floor load plates (FLP) 17 could be added to accommodate an increased number of cargo tie down D-rings, thereby providing a greater load dispersal area and corresponding increase in payload capability.

Figure 12:
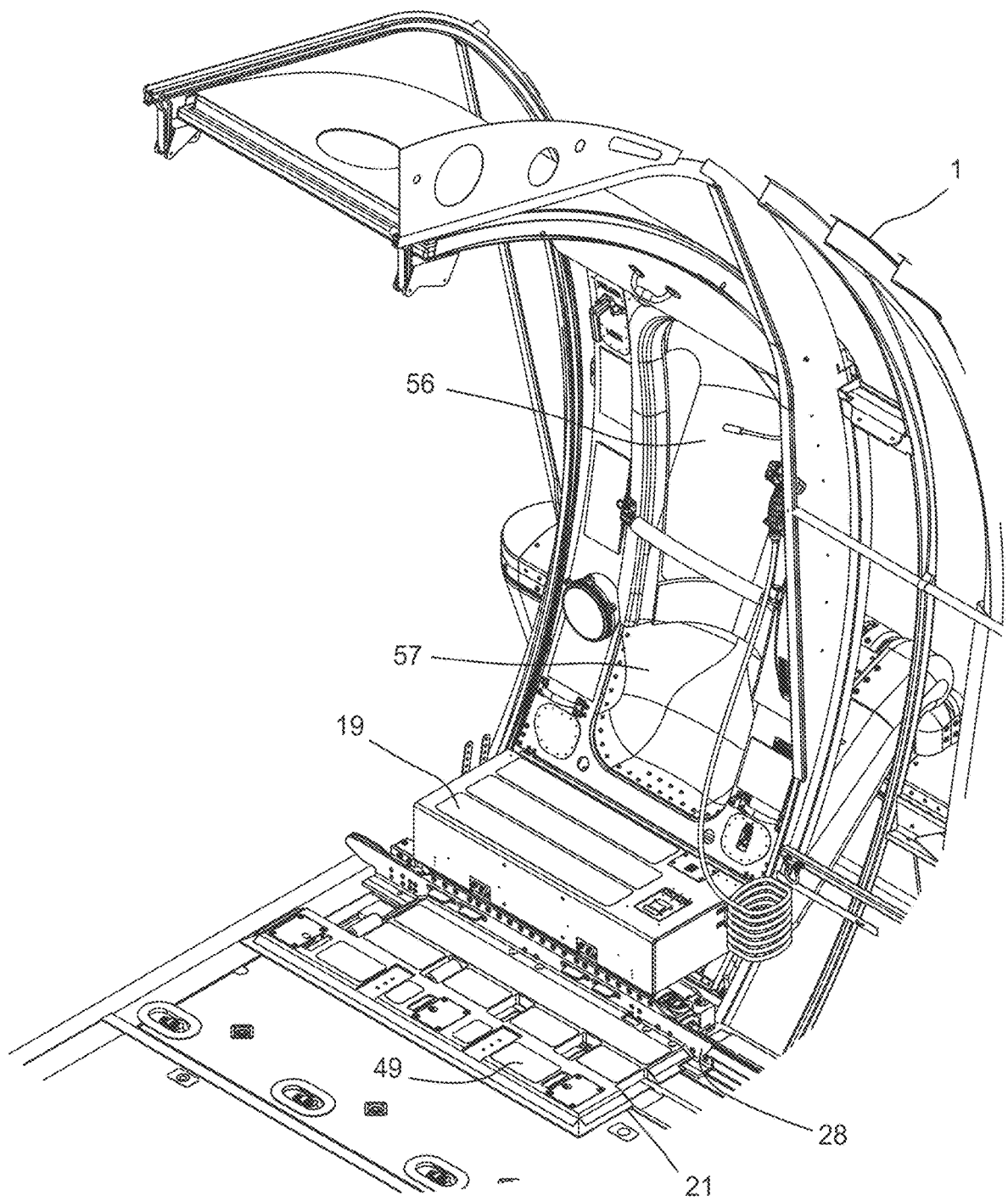
FIG. 12 depicts a deployable payload support stanchion deployed with a low-profile floor brace system (LPFBS) attached to same with both the lower close-out panel and upper door panel installed with manual retract sockets, disengaging clutch handles, dual electric drives, and control box, wherein several components of the assembly are covered by a removable armored AMS cover.
Figure 13:
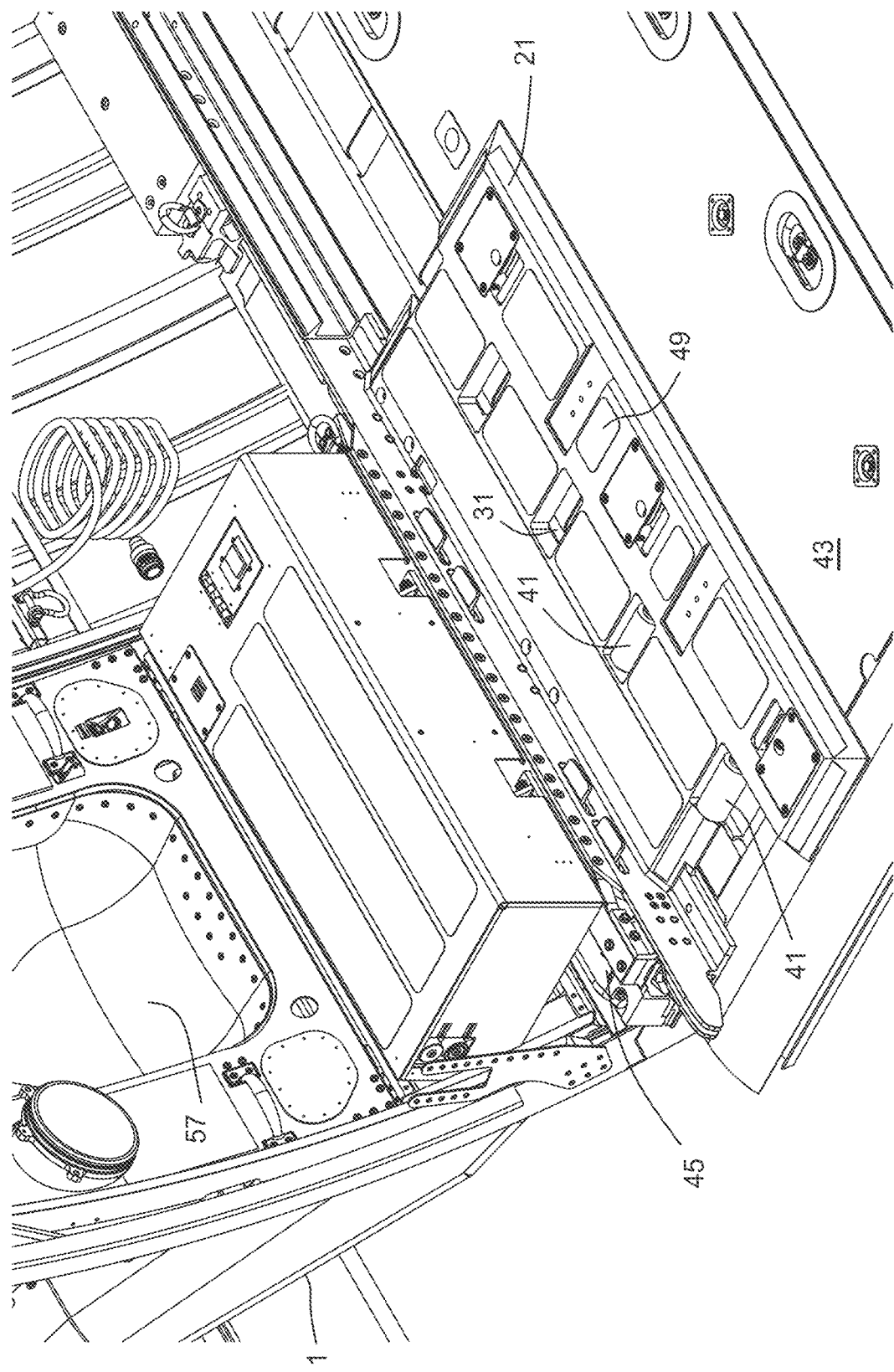
FIG. 13 depicts the completed assembly, including a low-profile floor brace installed with a portion covered by a removable AMS cover.
Figure 14:
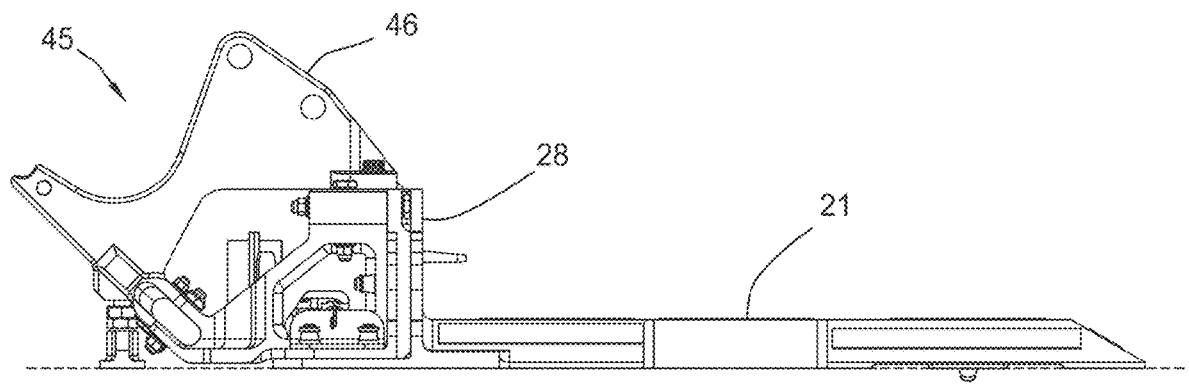
FIG. 14 depicts a side view of a brace assembly in accordance with the present invention.
Figure 15:
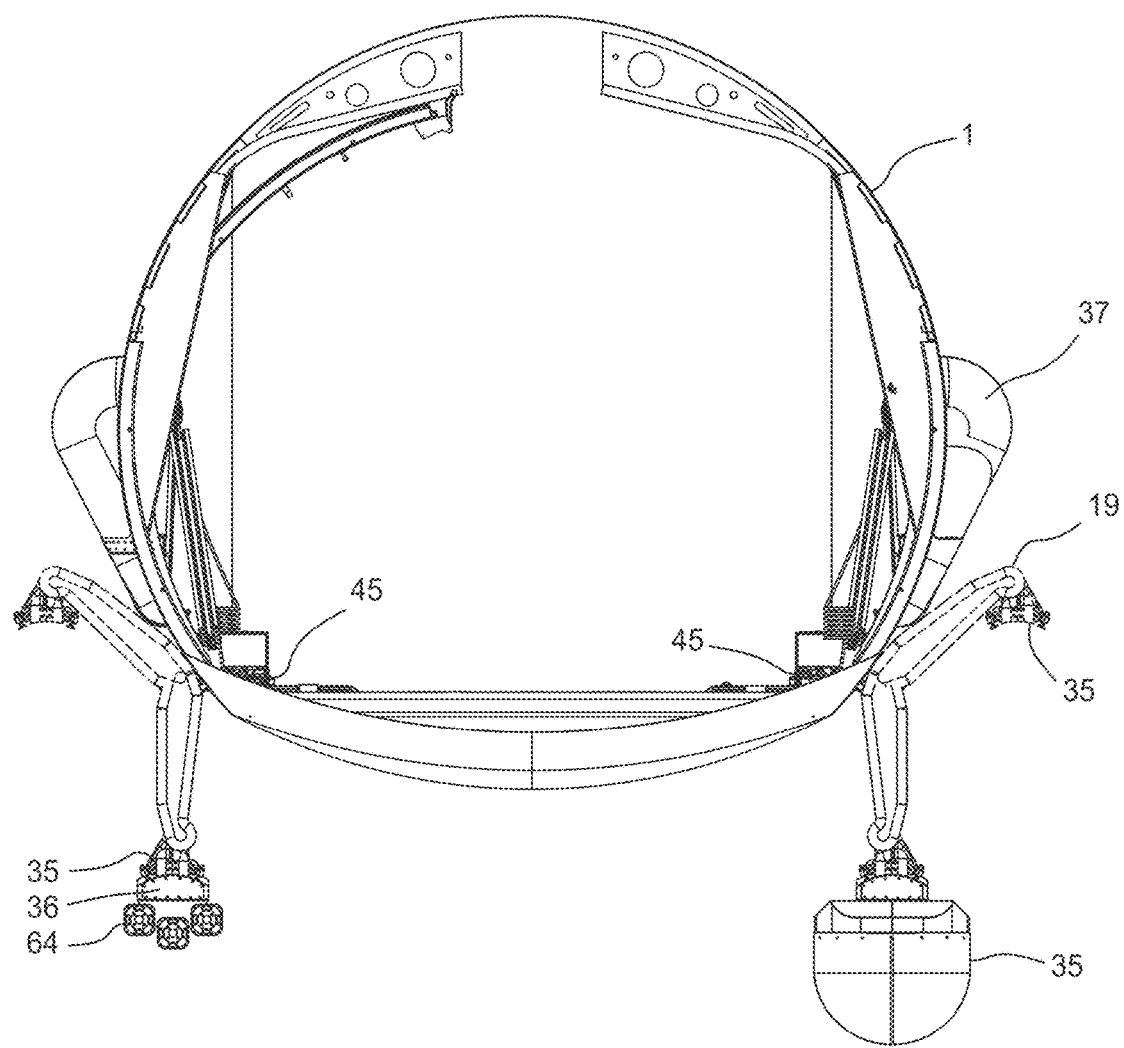
FIG. 15 depicts an external perspective of the subject apparatus with two deployable payload support stanchions deployed simultaneously outboard of the aircraft fully extended, wherein low-profile floor braces are used, and further wherein one deployable payload support stanchion is equipped with a triple ejector rack loaded with three dispensable stores, and the other deployable payload support stanchion is equipped with an integrated EO/IR surveillance and targeting sensor turret. In both instances the complete range of motion arcs of the deployable payload support stanchion into the aircraft is also depicted illustrating the ability of the deployable payload support stanchion gearing and drive mechanisms to accommodate in flight retraction and extension for sensor change and stores re-loading.
Figure 16:
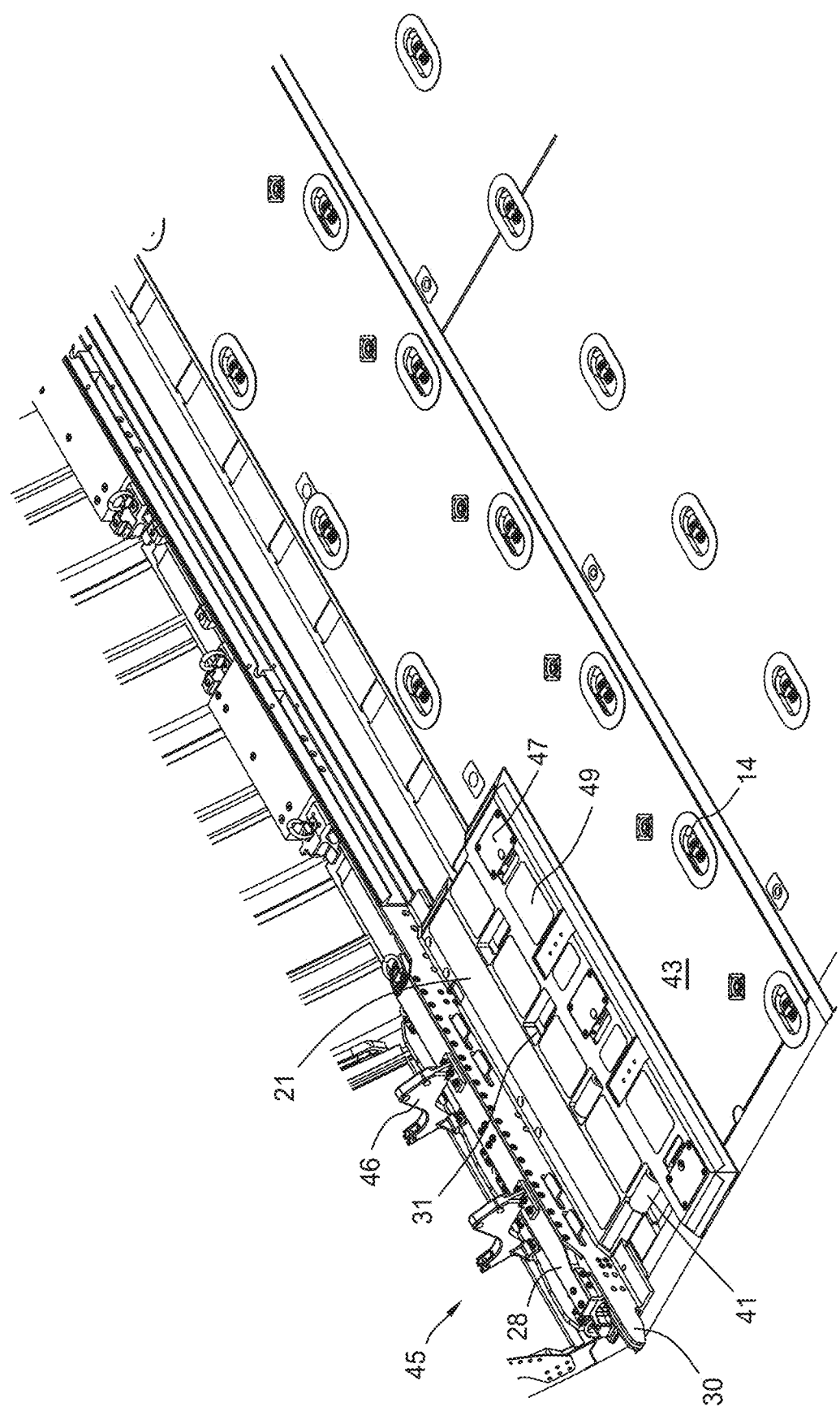
FIG. 16 depicts the installation of the AMS with the low-profile floor brace, which does not require adjustment or movement to enable full use of aircraft operations in flight.

As depicted in FIGS. 12, 13, and 15, particular embodiments can also accommodate a pair of brace systems 45, which may be low-profile floor brace systems (LPFBS), which can be attached to the deployable payload support stanchion motor housing casing 27. Such a configuration effectively increases the externally suspended payload weight of the sensor pods or other externally hung stores. Unlike the load transfer brace (LTB) shown in FIG. 10, if during the process of accommodating the increased payload the host aircraft must engage in air drop or any other activities, the LPFBS does not need to be retracted to a vertical position because the low-profile design is already out of the way of other mechanisms necessary to engage in air drop activities, allowing full use of aircraft operations during flight. Thus, in such instances, the brace system 45, in particular the low-profile floor brace system (LPFBS) and floor load plate (FLP) 17 can remain secured to the host aircraft cargo floor cargo tie down D-rings 14 using adjustable D-ring locks 18. In particular embodiments, such as shown in FIGS. 12, 13, and 15, the FLP or FLPs may be outboard FLPs because they are located at an outboard portion of the LPFBS or LPFBSs. It is noted although not depicted that a greater number and length of brace systems 45 and floor load plates (FLP) 17 could be added to accommodate an increased number of cargo tie down D-rings, thereby providing a greater load dispersal area and corresponding increase in payload capability.

As depicted in FIGS. 11, 12, 13, 14, and 16, particular embodiments of the brace system 45, here a low-profile floor brace system (LPFBS), include a support plate 21 and a spreader bar 28. By way of example and not by way of limitation, the support plate may be parallel to the floor of the aircraft and perpendicular to a cargo handling rail face 30. By way of example and not by way of limitation, the support plate 21 may also include one or more apertures 31, which in some instances may be rectangular, that are specially designed or otherwise configured to accommodate one or more rollers 41, which may be used on the aircraft 1. By way of example and not by way of limitation, the spreader bar 28 may be parallel to the support plate 21 (and thus also parallel to a floor 43 of the aircraft 1) and perpendicular to the cargo handling rail face 30. The spreader bar 28 may act as part of the load path of the AMS, and the LPFBS specifically. Although this disclosure describes the design of the low-profile floor brace in a particular manner, this disclosure contemplates the design of the low-profile floor brace system in any suitable manner By way of example and not by way of limitation, the material of the support plate 21 of the brace system 45 may be continuous with material of a cargo handling rail face 30. Such a configuration, where both components may have been machined together, may create greater strength at the joint and thus support a larger load. By way of example and not by way of limitation, of the brace system 45, the material of the support plate 21 may be non-continuous with the material of the cargo handling rail face 30. Such a configuration may be simpler to machine. In such instances, the support plate 21 may be connected to the material of the cargo handling rail face 30 via support brackets 46.

In particular embodiments, the brace system 45 may include one or more D-ring clamps 47, which can be used to connect to cargo tie down D-rings, which D-rings 14 may be integrated into the floor 43 of the aircraft 1. In particular embodiments, the brace system 45 may be secured using one or more fasteners, which fasteners may be placed along the cargo handling rail face 30 and be used to secure the support plate to the floor 43 of the aircraft 1. The cargo handling rail face 30 may be part of an ADS rail 12, which may be part of a cargo handling system, and may further be used as a reference point to properly orient the brace system 45.

In particular embodiments, the brace system 45 may be coupled to the floor 43 of the aircraft 1 at attachment locations that are designed and generally used for cargo handling system rails. In particular embodiments, a cargo rail may be integrated as part of the brace system 45 to increase the integrity and load-bearing capabilities of the system. In particular embodiments, a non-skid surface 49 may be added to the top of the support plate 21 to increase the safety of the crew of the aircraft. The brace system 45 may be installed along multiple inner surfaces of the aircraft, including floors and walls. Additionally or alternatively, the brace system 45 may be installed in symmetric or asymmetric configurations along different aircraft axes, including configurations with multiple brace systems 45 on the same or opposite sides of the aircraft. Although this disclosure describes securing a brace system to an aircraft in a particular manner, this disclosure contemplates securing a brace system to an aircraft in any suitable manner.

In particular embodiments, the payload mounting apparatus may utilize a transport and alignment carrier (TAC) 20.

In any of the aforementioned embodiments, the payload support stanchion may support a payload assembly that interfaces to the stanchion. By way of example and not by way of limitation, the payload assembly may include one or more of a NATO compliant ordinance rack, unmanned aerial vehicle systems, unmanned ground systems, unmanned water surface vehicle systems, unmanned underwater vehicle systems, optical sensors, multi- and hyper-spectral sensors, high and ultra-high intensity light arrays, high and ultra-high intensity acoustic arrays, electro-optical sensors, electromagnetic spectrum sensors, atmospheric sensors, ordinance, sonobuoy compliant tube ejector rack(s), common launch tube ejector rack(s), ordinance countermeasures, laser offensive and defensive countermeasures, and/or directed energy offensive and defensive countermeasures. Additionally or alternatively, by way of example and not by way of limitation, the payload mounting apparatus may comprise a timing shaft, which timing shaft may be used to maintain the payload assembly in a selectable orientation during support stanchion deployment and retraction by, for example, ensuring two gear heads are aligned in their position relative to each other based on rotational inputs. Although this disclosure describes a payload assembly in a particular manner, this disclosure contemplates a payload assembly in any suitable manner.

In particular embodiments, a rigid and/or non-rigid ballistics armor covering and/or a rigid and/or non-rigid electro-magnetic shield covering may cover all or part of the surface of the payload mounting apparatus.

Figure 17A:
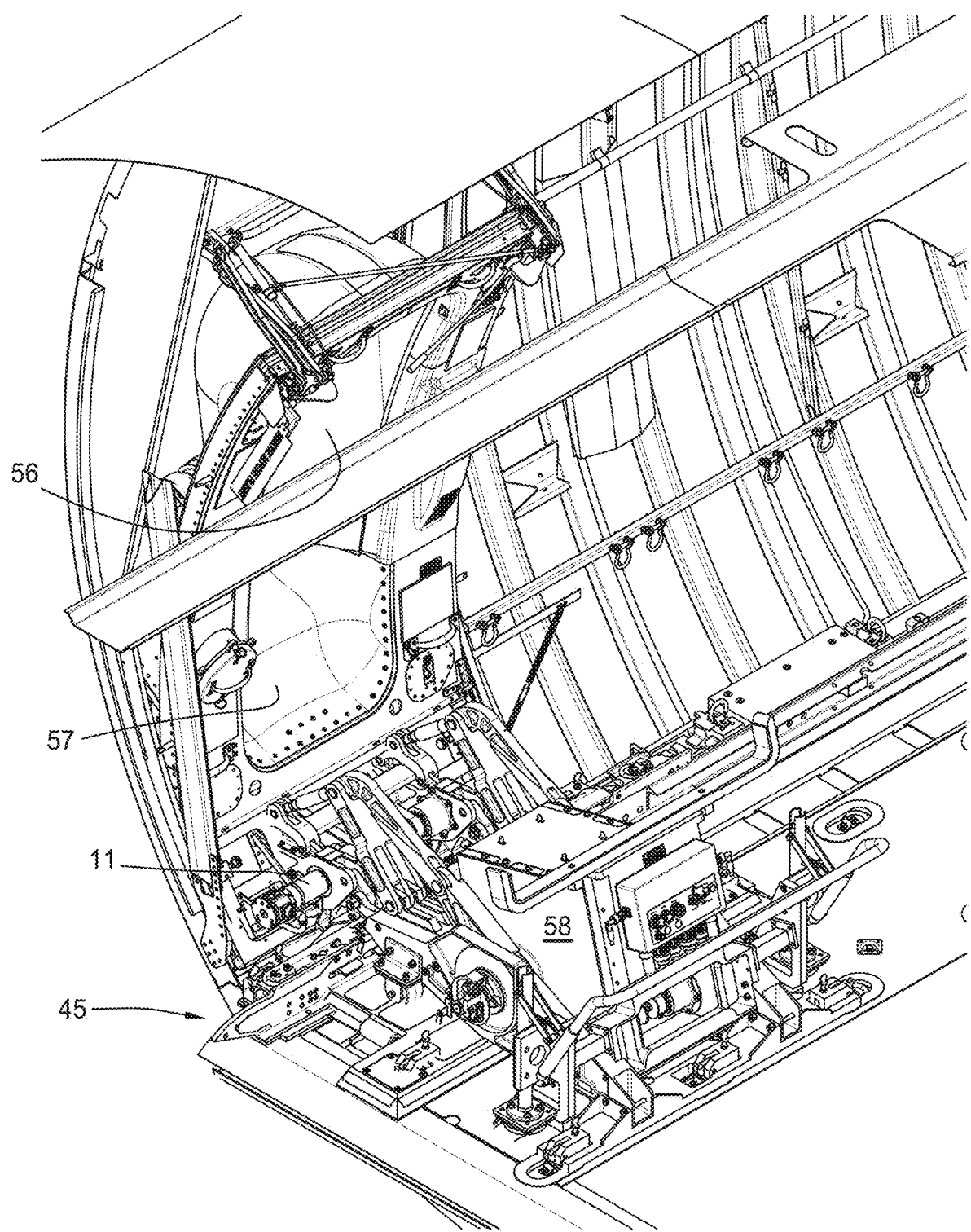
FIG. 17A and FIG. 17B depict a rotationally-articulated deployable payload support stanchion being aligned to the deployable payload support stanchion secondary retract, wherein use of the low-profile floor brace allows the retraction of the fully-assembled deployable payload support stanchion via the AMS to be stowed into the aircraft fuselage during flight.
Figure 17B:
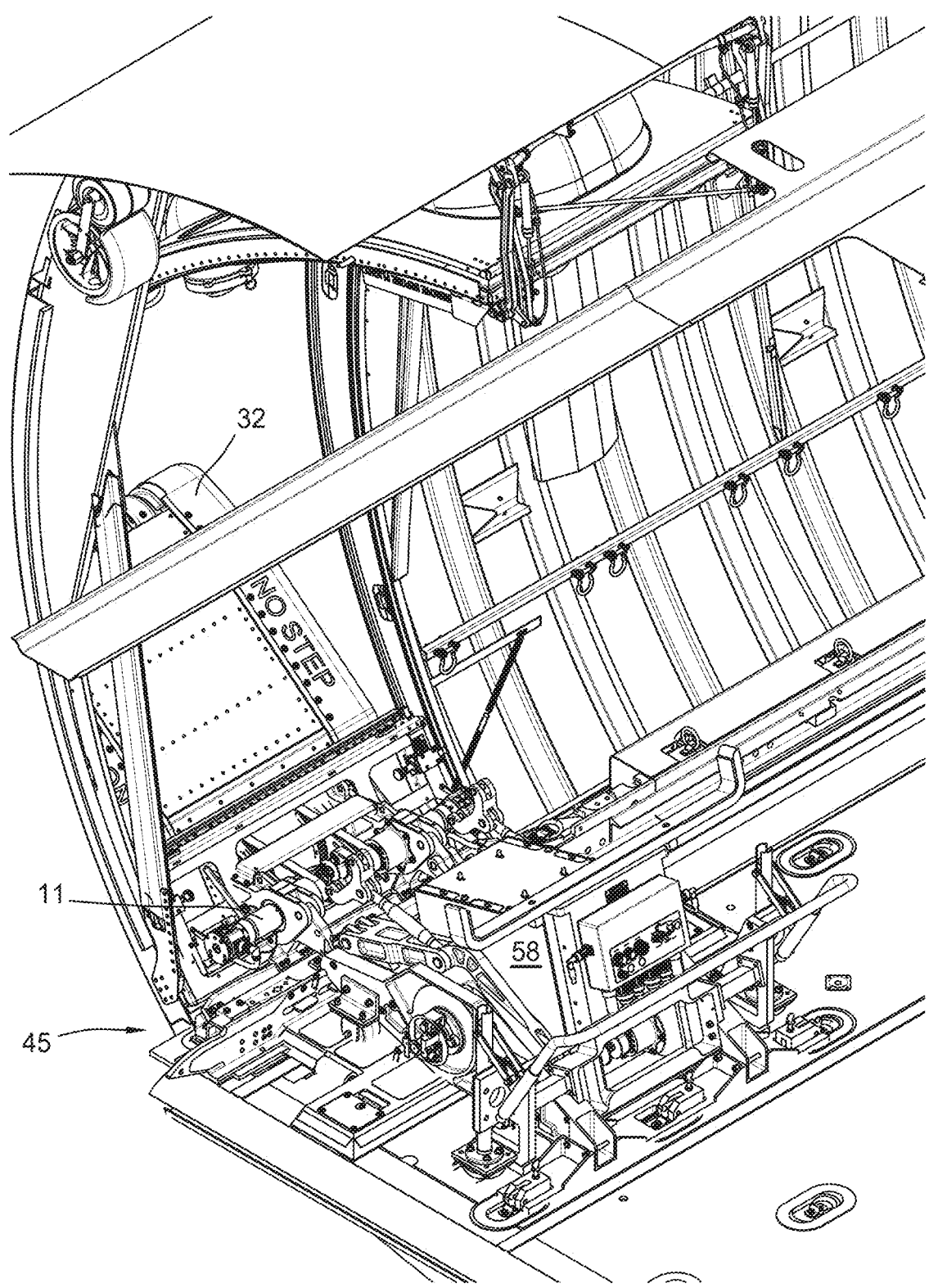

As depicted in FIG. 17A and FIG. 17B, in particular embodiments, a payload mounting apparatus may include a rotationally-articulated deployable payload support stanchion 32, which, as shown, may be aligned to a deployable payload support stanchion secondary retract 58. As shown, use of a brace system 45, specifically a low-profile floor brace system (LPFBS), allows retraction of the fully assembled deployable payload support stanchion 32 via the AMS 11 to be stowed in the aircraft fuselage during flight. By way of example and not by way of limitation, the rotationally-actuated deployable payload support stanchion 32, would be rotated about the AMS 11 via the shoulder armature assembly 33, through the open doorway, and the single piece door plug 55, or alternatively the combined door plug upper panel 56, and door plug lower panel 57, installed to seal the doorway. The use of the deployable payload support stanchion secondary retract 58 allows the full deployable payload support stanchion with a door-compliant pod to be both deployed from and stowed in the aircraft during flight. The deployable payload support stanchion secondary retract rotates the deployable payload support stanchion 32 and payload via a mechanical drive system from the inside the fuselage outboard and vice versa. Upon deployment of the payload support stanchion 32 outside of the aircraft, the deployable payload support stanchion secondary retract 58 can then be detached from the deployable payload support stanchion 32 and rolled or moved away and stowed thus allowing the deployable payload support stanchion 32 and aircraft cargo area full functionality for all operations. The mechanical drive system of the deployable payload support stanchion secondary retract 58 is an electro-mechanical system that rotates the deployable payload support stanchion 32 and payload about an axis that is parallel to the fore and aft axis of the aircraft. The electro-mechanical system is divided into four groups. The four groups are: Harmonic Drive Gear Set, Planetary Gearhead, Motor-Electrical, Brake, and Timing Assembly, consisting of a Pulley, Timing Belt, Sprocket and Gear, and Bushing. As an example and not by way of limitation, the AS-7R SRI electro-mechanical drive system may be attached to the AS-7 Strut system on one end (Retract Adapter) and to the aircraft cargo floor via the Airdyne Incorporated AMS Rail Assembly and Floor Plate Assembly (via cargo tie-down rings) on the opposite end.

Method of Operation

The preferred methodology as described herein for installing and employing the apparatus of the current invention typically involves two crew members familiar with airframe maintenance. The entire assembly can be man portable and can consist of a deployable payload support stanchion transport & alignment case 20, a payload case of suitable size and typical single sensor pod/ordinance loader to position and elevate the sensor pod once the deployable payload support stanchion is installed.

In particular embodiments, a payload mounting apparatus may be installed in an aircraft. As an example and not by way of limitation, the installation sequence can begin with the attachment of the deployable payload support stanchion transport & alignment case 20 to the floor of a host aircraft, for example a Lockheed-Martin C-130 aircraft 1, wherein the paratroop door would be opened and secured. As an example and not by way of limitation, the adaptive mounting system (AMS) 11 could be secured to the ADS rail 12, and the rotationally-actuated deployable payload support stanchion 32, assembly secured to the AMS motor housing flange 26, by means of the motor housing bolt assembly 25. As an example and not by way of limitation, at this point the rotationally-actuated deployable payload support stanchion 32, would be rotated about the shoulder armature assembly 33, through the open doorway, and the single piece door plug 55, or alternatively the combined door plug upper panel 56, and door plug lower panel 57, installed to seal the doorway.

As an example, and not by way of limitation, the load transfer braces (LTB) 16 and floor load plate (FLP) 17 assembly could then be lowered into position and connected to multiple cargo tie-down "D" ring 14, means by using several adjustable D-ring locks 18 secured in place by multiple adjustment bolts 22. Finally, as an example and not by way of limitation, the entire shoulder armature assembly 33, twin drive motors 38, and associated electrical and mechanical gearing could be covered by a removable AMS armored cover 19. As an example and not by way of limitation, the entire system could be checked using a localized controller to verify indicator light positions against the actual position of the deployable payload support stanchion. The deployable payload support stanchion emergency manual retract could also be tested. As an example and not by way of limitation, the door assembly could then be tested for functionality and non-interference with the rotationally-actuated deployable payload support stanchion 32.

As an example and not by way of limitation, the rotationally-actuated deployable payload support stanchion 32 could be secured in the up or retracted position external to the aircraft in readiness for attachment of various payloads to the NATO ordinance rack 35 or triple ejector rack 36. As an example and not by way of limitation, a typical bomb/ordinance loader carrying any number of payloads including a single sensor 60, and RF antenna pod 61, and EWSP missile countermeasures pod 62, jettisonable stores 64, or other sensor pod could be positioned below the NATO ordinance rack 35 or triple ejector rack 36 and the mission components physically attached to the rotationally-actuated deployable payload support stanchion 32 using procedures and methods common within the field of ordinance loading. As an example and not by way of limitation, the loader could then be removed along with the deployable payload support stanchion transport and alignment carrier 20, and the various power, data, pod, and control system cables connected for diagnostics testing and ultimate mission usage. Although this disclosure describes a method of installing a payload mounting apparatus in a particular manner, this disclosure contemplates a method of installing a payload mounting apparatus in any suitable manner.

In particular embodiments, a brace system 45, in particular a low-profile floor brace system (LPFBS), may be installed in place of an existing air deployment system (ADS) rail 12. As an example and not by way of limitation, a method of installing the brace system 45 may include removing the existing ADS rail 12 and installing the brace system 45 directly to a cargo floor where the ADS was before. After the brace system 45 is installed, all loads due to the interface between the brace system and the cargo floor no longer go through the ADS rail 12 and an associated adaptive mounting system (AMS) plate.

As an example and not by way of limitation, after the brace system 45 is installed such that it interfaces with the cargo floor, a deployable support stanchion is coupled to the brace system 45. The deployable support stanchion may extend from an interior of the aircraft to the exterior of the aircraft via a closeout panel assembly. In some instances, to install the closeout panel assembly, a pressurized door plug may first be removed. The closeout panel assembly interfaces with a door aperture to ensure aircraft pressurization.

As an example and not by way of limitation, the payload mounting apparatus may be installed by first removing a cargo handling rail from a cargo floor of an aircraft. Then, a brace system 45, such as an LPFBS, may be installed directly to the cargo floor. As an example and not by way of limitation, installing the payload mounting apparatus may further involve connecting a plurality of D-rings associated with the brace system 45, such as an LPFBS, to D-rings that are integrated into the cargo floor of the aircraft.

As an example and not by way of limitation, a deployable payload support stanchion, such as one described above, may be coupled to the brace system 45, such as the LPFBS, after the brace system 45 is installed. Alternatively or additionally, as an example and not by way of limitation, the deployable payload support stanchion may be coupled to the spreader bar 28 and/or the support plate 21. Further, as an example and not by way of limitation, the deployable payload support stanchion may be extended through the door aperture to the exterior of the aircraft and the aircraft subsequently sealed from ambient atmosphere using a modular door panel assembly, which modular door panel assembly allows for the continued extension through the door aperture without affecting the pressure inside the aircraft. Although this disclosure describes installing a payload mounting apparatus, and in particular a brace system, in a particular manner, this disclosure contemplates installing a payload mounting apparatus, and in particular a brace system, in any suitable manner.

While preferred embodiments have been shown and described, various substitutions and modifications may be made without departing from the spirit and scope of the invention. Accordingly it is to be understood that the present invention has been described by way of illustration and not limitation.

What is claimed is:

1. A method of installing a payload mounting apparatus for an aircraft, the method comprising:

removing a cargo handling rail from a cargo floor of the aircraft; and installing a brace system of the payload mounting apparatus directly to the cargo floor of the aircraft, wherein the brace system comprises:

a support plate, wherein the support plate is parallel to the cargo floor of the aircraft and perpendicular to a cargo handling rail face;

a spreader bar, wherein the spreader bar is parallel to the cargo floor of the aircraft and the support plate and perpendicular to the cargo handling rail face;

a surface of the support plate, wherein the surface of the support plate interfaces with the cargo floor of the aircraft; and a plurality of slots in the support plate configured to accommodate one or more rollers.

2. The method of installing the payload mounting apparatus of claim 1, further comprising connecting a plurality of D-rings to a plurality of D-ring clamps, wherein the brace system comprises the plurality of D-ring clamps configured to connect to D-rings, and the D-rings are integrated into the cargo floor of the aircraft.

3. The method of installing the payload mounting apparatus of claim 1, further comprising:

coupling a deployable payload support stanchion to the brace system, wherein the deployable payload support stanchion extends from an interior of the aircraft to an exterior of the aircraft via a closeout panel assembly; and wherein the closeout panel assembly interfaces with a door aperture to ensure aircraft pressurization.

4. The method of installing the payload mounting apparatus of claim 3, wherein the deployable payload support stanchion extends through the door aperture to the exterior of the aircraft; and the aircraft is sealed from ambient atmosphere by a modular door panel assembly, wherein the modular door panel assembly allows an extension of the support stanchion through the door aperture.

5. The method of installing the payload mounting apparatus of claim 1, further comprising coupling a deployable payload support stanchion to the spreader bar.

6. The method of installing the payload mounting apparatus of claim 1, further comprising coupling a deployable payload support stanchion to the support plate.

* * * * *